US011668534B2

(12) United States Patent
Landreth et al.

(10) Patent No.: US 11,668,534 B2
(45) Date of Patent: Jun. 6, 2023

(54) FAN ARRAY FAULT RESPONSE CONTROL SYSTEM

(71) Applicant: Baltimore Aircoil Company, Inc., Jessup, MD (US)

(72) Inventors: Glen Landreth, Duarte, CA (US); Michael Leibel, Silver Spring, MD (US); Ryan Most, Spring Grove, PA (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 446 days.

(21) Appl. No.: 16/714,044

(22) Filed: Dec. 13, 2019

(65) Prior Publication Data
US 2020/0191506 A1 Jun. 18, 2020

Related U.S. Application Data

(60) Provisional application No. 62/779,182, filed on Dec. 13, 2018.

(51) Int. Cl.
*F28F 27/00* (2006.01)
*F28D 5/00* (2006.01)
(Continued)

(52) U.S. Cl.
CPC .......... *F28F 27/003* (2013.01); *F04D 27/004* (2013.01); *F04D 27/008* (2013.01);
(Continued)

(58) Field of Classification Search
CPC ...... F28F 27/003; F28F 27/004; F28F 27/008; F28F 2250/08; F25B 39/028;
(Continued)

(56) References Cited

U.S. PATENT DOCUMENTS

| 3,922,153 A | 11/1975 | Engalitcheff, Jr. |
| 4,085,594 A | 4/1978 | Mayer |

(Continued)

FOREIGN PATENT DOCUMENTS

| CN | 1421117 A | 5/2003 |
| CN | 101675250 A | 3/2010 |

(Continued)

OTHER PUBLICATIONS

Davera Corp. LLC, Royal Supply Co.; Draftguard Anti-Rotation Device product guide printed from Wayback Machine: https://web.archive.org/web/20170711033627/https://www.royalsupply.com/store/pc/Draftguard-Anti-Rotation-Device-c3993.htm dated Jul. 11, 2017; 2 pages.

(Continued)

*Primary Examiner* — Tho V Duong
*Assistant Examiner* — Raheena R Malik
(74) *Attorney, Agent, or Firm* — Fitch, Even, Tabin & Flannery LLP (57) ABSTRACT

In one aspect, a fan array fault response control system is provided for a cooling tower. The fan array fault response control system includes a fan interface configured to be in communication with a plurality of fans of the cooling tower and a processor operably coupled to the fan interface. The processor is configured to detect at least one non-operational fan of the plurality of fans. The processor configured to effect, in response to detecting the at least one non-operational fan, a reduced fan speed of at least one operational fan of the plurality of fans.

39 Claims, 6 Drawing Sheets

(51) Int. Cl.
    *F04D 27/00* (2006.01)
    *F25B 39/02* (2006.01)
(52) U.S. Cl.
    CPC .............. *F25B 39/028* (2013.01); *F28D 5/00* (2013.01); *F25B 2339/0242* (2013.01); *F25B 2600/112* (2013.01); *F25B 2700/173* (2013.01); *F28F 2250/08* (2013.01)
(58) Field of Classification Search
    CPC ........ F25B 2339/0242; F25B 2600/112; F25B 2700/173; F28D 5/00
    USPC .......................................................... 62/171
    See application file for complete search history.

(56) References Cited

U.S. PATENT DOCUMENTS

| | | | |
|---|---|---|---|
| D253,781 S | 12/1979 | Engalitcheff, Jr. | |
| D253,844 S | 1/1980 | Engalitcheff, Jr. | |
| 4,265,645 A | 5/1981 | Merrill | |
| 4,283,612 A | 8/1981 | Richards | |
| 4,490,312 A | 12/1984 | Furr | |
| 4,530,804 A | 7/1985 | Cates | |
| 4,543,218 A | 9/1985 | Bardo | |
| 4,637,903 A | 1/1987 | Bardo | |
| 4,683,101 A | 7/1987 | Cates | |
| 4,737,321 A | 4/1988 | McCloskey | |
| 4,831,831 A | 5/1989 | Carter | |
| 4,913,710 A | 4/1990 | Reverdy | |
| 4,964,279 A | 10/1990 | Osborne | |
| 4,976,895 A | 12/1990 | Bardo | |
| 5,028,357 A | 7/1991 | Bardo | |
| 5,040,377 A * | 8/1991 | Braun ................... F25B 49/027 62/183 |
| 5,150,581 A | 9/1992 | Smith | |
| 5,155,961 A | 10/1992 | Bardo | |
| 5,180,528 A | 1/1993 | Kaplan | |
| 5,193,352 A | 3/1993 | Smith | |
| 5,383,339 A | 1/1995 | McCloskey | |
| 5,386,709 A | 2/1995 | Aaron | |
| 5,390,505 A | 2/1995 | Smith | |
| 5,431,858 A | 7/1995 | Harrison, Jr. | |
| 5,435,382 A | 7/1995 | Carter | |
| 5,596,877 A | 1/1997 | Morrison | |
| 5,724,828 A | 3/1998 | Korenic | |
| 5,816,318 A | 10/1998 | Carter | |
| 5,851,446 A | 12/1998 | Bardo | |
| 5,902,522 A | 5/1999 | Seawell | |
| 6,142,219 A | 11/2000 | Korenic | |
| 6,213,200 B1 | 4/2001 | Carter | |
| 6,223,544 B1 | 5/2001 | Seem | |
| 6,237,900 B1 | 5/2001 | Drew | |
| 6,526,333 B1 | 2/2003 | Henderson | |
| 6,564,864 B2 | 5/2003 | Carter | |
| 6,574,908 B1 | 6/2003 | Sanner | |
| 6,932,696 B2 * | 8/2005 | Schwartz ............... G06F 1/20 361/695 |
| 6,954,684 B2 | 10/2005 | Frankel | |
| 7,107,782 B2 | 9/2006 | Carter | |
| 7,310,958 B2 | 12/2007 | Carter | |
| 7,484,718 B2 | 2/2009 | Facius | |
| 7,558,031 B2 | 7/2009 | Boren | |
| 7,603,774 B2 | 10/2009 | Facius | |
| 7,779,898 B2 | 8/2010 | Morrison | |
| 7,802,774 B2 | 9/2010 | Facius | |
| 7,890,215 B2 | 2/2011 | Duncan | |
| 8,190,396 B2 | 5/2012 | Yanao | |
| 8,433,450 B2 | 4/2013 | Francino | |
| 8,434,746 B2 | 5/2013 | Carter | |
| 8,774,978 B2 | 7/2014 | Higgins | |
| 8,981,950 B1 | 3/2015 | Kates | |
| 9,004,463 B2 | 4/2015 | Carter | |
| 9,057,563 B2 | 6/2015 | Carter | |
| 9,057,564 B2 | 6/2015 | Carter | |
| 9,157,647 B2 | 10/2015 | Leen | |
| 9,255,739 B2 | 2/2016 | Aaron | |
| 9,279,619 B2 | 3/2016 | Aaron | |
| 9,587,885 B2 | 3/2017 | Aaron | |
| 9,803,929 B2 | 10/2017 | Aaron | |
| 9,995,533 B2 | 6/2018 | Aaron | |
| 10,031,535 B2 | 7/2018 | Rollins | |
| 10,132,577 B2 | 11/2018 | Martell | |
| 10,288,351 B2 | 5/2019 | Aaron | |
| 10,415,902 B2 | 9/2019 | Shin | |
| 10,443,942 B2 | 10/2019 | Aaron | |
| 10,519,960 B2 * | 12/2019 | Kelly ................... F04D 29/582 |
| 10,571,197 B2 * | 2/2020 | Beaver ................... F28F 1/025 |
| 2010/0076728 A1 * | 3/2010 | Yanao ................ G05B 23/0237 702/183 |
| 2011/0100593 A1 * | 5/2011 | Benz ...................... F28D 5/02 165/59 |
| 2011/0229322 A1 | 9/2011 | Tadayon | |
| 2011/0289951 A1 * | 12/2011 | Furlong ................... F28C 1/14 62/171 |
| 2012/0037338 A1 | 2/2012 | Pearson | |
| 2012/0113582 A1 * | 5/2012 | Hirano ................... G06F 1/20 312/319.1 |
| 2016/0047578 A1 | 2/2016 | Warren | |
| 2017/0198973 A1 | 7/2017 | Bugler | |
| 2018/0094884 A1 | 4/2018 | Rousselet | |
| 2018/0100701 A1 | 4/2018 | Beaver | |
| 2018/0172367 A1 | 6/2018 | Shin | |
| 2018/0224174 A1 | 8/2018 | Hollander | |
| 2018/0283792 A1 | 10/2018 | Shin | |
| 2019/0145721 A1 | 5/2019 | Blay | |

FOREIGN PATENT DOCUMENTS

| | | |
|---|---|---|
| CN | 202204336 U | 4/2012 |
| CN | 103547122 A | 1/2014 |
| CN | 108413528 A | 8/2018 |
| EP | 2163768 | 3/2010 |

OTHER PUBLICATIONS

Gao, Jim; "Machine Learning Applications for Data Center Optimization," Google; Downloaded from URL:https://static.googleusercontent.com/media/research.google.com/en//pubs/archive/42542.pdf; publicly availabe before Dec. 13, 2018; 13 pages.

International Search Report and Written Opinion from International Application No. PCT/US2019/066263 dated Mar. 3, 2020; 16 pages.

Venkatesh, Pranav Yedatore; "Creating a New Model to Predict Cooling Tower Performance and Determining Energy Saving Opportunities Through Economizer Operation," Downloaded from URL:https://scholarworks.umass.edu/cgi/viewcontent.cgi?article=1253&context=masters_theses_2; (2015) Masters Theses. 489. https://ScholarWorks@UMass.edu/masters_theses_2/489; 106 pages.

European Patent Office, extended European Search Report from related European Application No. 19896781.2 dated Jul. 15, 2022, 9 pages.

Chinese Office Action with machine translation from related Chinese Patent Application No. 201980082933.0 dated Feb. 27, 2023; 18 pages.

* cited by examiner

FAN ARRAY FAULT RESPONSE CONTROL SYSTEM

CROSS REFERENCE TO RELATED APPLICATION

This application claims the benefit of U.S. Provisional Patent Application No. 62/779,182, filed Dec. 13, 2018, which is hereby incorporated by reference herein in its entirety.

FIELD

This disclosure relates to a fan array of a heat rejection apparatus and, more specifically, to a control system for a fan array of a heat rejection apparatus.

BACKGROUND

Some heat rejection apparatuses, such as a closed-circuit cooling tower, an evaporative condenser, or an evaporative cooling tower, utilize an array of fans to generate airflow within the device. When one of the fans of the fan array fails, such as the failure of a motor associated with the fan, the operating fans continue to generate airflow within the device. For example, for a forced draft evaporative cooling unit with a fan array, one or more of the fans of the fan array may become non-operational. A non-operational fan may be completely non-operational such that the fan is unable to run at all, such as due to a complete motor failure, or partially non-operational such that the fan is unable to run at the requested speed but may still run at a reduced speed, such as due to a bearing failure or fan imbalance which limits the speed of the fan. The non-operational fan may be forced to run backwards by the operating fans. Further, the operational fans create a high pressure within the evaporative cooling device which can push air outwards through the opening of the non-operational fan and cause water to splash out through the opening. The air and water escaping through the non-operational fan may adversely affect operation of the forced draft evaporative cooling unit. Further, the water escaping through the opening of the non-operational fan may be undesirable in subfreezing climates.

For an induced draft fan array, should one or more of the fans become non-operational, the non-operational fan will be run backward by the operational fans. The non-operational fan will pull air inward causing air recirculation and loss of total induced airflow.

Historically, controlling the operation of an evaporative cooling device when one of the fans of the device fail has been controlled with physical barriers or louvers between the individual fans, which are not feasible for devices having a large array of smaller fans. Those solutions are expensive, impede access for maintenance, and can adversely affect device performance.

SUMMARY

In one aspect of the present disclosure, a fan array fault response control system is provided for a cooling tower, such as a forced draft cooling tower. The fan array fault response control system includes a fan interface configured to be in communication with a plurality of fans of the cooling tower and a processor operably coupled to the fan interface. The processor is configured to detect at least one non-operational fan of the plurality of fans. The processor is configured to effect, in response to detecting the at least one non-operational fan, a reduced fan speed of at least one operational fan of the plurality of fans. In one embodiment, the processor may effect a reduced fan speed of the at least one operational fan to reduce air pressure within the cooling tower acting on the non-operational fan and limit liquid within the cooling tower from exiting the cooling tower via the non-operational fan.

In one embodiment, the processor is configured to effect a reduced fan speed of at least one operational fan of the plurality of fans based at least in part on the proximity of the at least one operational fan to the at least one non-operational fan. The processor may thereby effect reduced fan speed of the at least one operational fan near the at least one non-operational fan while permitting fans farther away from the at least one non-operational fan to continue to operate at requested speeds. The processor may thereby strike a balance between limiting liquid splashing out of the non-operational fan and providing the airflow requested of the operational fans.

In one embodiment, the fan array is configured in a forced draft orientation of the cooling tower. The speed of the at least one operational fan may be below the speed at which evaporative fluid would discharge from the non-operational fan.

The present disclosure also provides a heat rejection apparatus, such as a cooling tower, that includes a heat exchanger and a liquid distribution system configured to direct liquid toward the heat exchanger. The heat rejection apparatus includes a plurality of fans configured to generate airflow relative to the heat exchanger, a sump, and a pump operable to pump liquid from the sump to the liquid distribution system. The heat rejection apparatus further includes a controller operably coupled to the fans and configured to detect at least one non-operational fan of the plurality of fans. The controller is configured to effect a reduced fan speed of at least one operational fan of the plurality of fans upon detecting the at least one non-operational fan. The reduced fan speed of the at least one operational fan may inhibit internal air pressure near the at least one non-operational fan from causing the at least one non-operational fan to draw air and liquid outward from the heat rejection apparatus.

In another aspect of the present disclosure, a method is provided for controlling a heat rejection apparatus. The heat rejection apparatus includes a heat exchanger, a liquid distribution system configured to direct liquid toward the heat exchanger, and a plurality of fans configured to generate airflow relative to the heat exchanger. The method includes determining at least one of the fans is non-operational and causing, upon detection of the at least one non-operational fan, at least one operational fan of the plurality of fans to rotate at a reduced fan speed. The method may thereby provide an approach to limit the liquid from being blown out of the heat rejection apparatus via the at least one non-operational fan.

DETAILED DESCRIPTION

In accordance with one aspect of the present disclosure, a fan array fault response control system is provided for a heat rejection apparatus such as a cooling tower. The fan array fault response control system may automatically detect and respond to one or more non-operational fans of a fan array of the heat rejection apparatus without intervention by the end user of the device. The fan array fault response control system may detect and respond to a variety of faults that would prevent an individual fan motor from operating. Examples of situations that may cause a fan to become non-operational are a loss of a fan speed control signal, a failure of a fan motor, a tripped power breaker, loss of phase, failure of motor bearings, delamination of magnets, or short-circuited wiring or electronics. One or more of these situations, or other situations, may trigger remedial action by the fan array fault response control system. In one embodiment, the fan array fault response control system has an operating mode and responds to the fault by reconfiguring to a safe mode of operation. In the safe mode of operation, the fans are operated to minimize reversed airflow and water loss through the openings of the one or more non-operational fans. The safe mode of operation may include limiting all or some of the individual fans to lower speeds than normal to reduce the local air pressure acting on the non-operational fans so that the non-operational fans rotate slowly in the reverse direction or not at all. This keeps the non-operational fans from pushing air outward from the heat rejection apparatus. Further, some operational fans may also have a minimum speed set to inhibit the operational fans from having backflow issues caused by the air pressure generated by the overall fan array.

More specifically, upon detecting a failure of one or more of the fans of the fan array, an alarm is operated. The alarm triggers a fan motor speed control system of the fan array fault response control system to set speed limits for the operational fans of the fan array. The speed limits may either be the same for all operational fans or may be different for the fans based upon a predetermined criteria. The criteria may include, for example, the location of the non-operational fans relative to the individual operational fans, whether the spray pump is operating or not, or a combination thereof. The speed limits of the operational fans can be varied to account for the overall operational state of the heat rejection apparatus. The alarm may include a local notification apparatus that is operated upon failure of one of the fans to assist a repair person in identifying the failure condition. Further, the alarm provides remote annunciation of the alarm to higher level system controls of the associated cooling system.

Since performance requirements can vary throughout the operational life of a heat rejection apparatus, at times it may be necessary to override the safe mode of operation for the operational fans particularly in times of peak cooling demand. In one embodiment, the fan array fault response control system includes an override that provides the ability to change the fan array fault response control system to an override mode. In the override mode, the fan array fault response control system removes the limits on operational fan speeds as needed without affecting the alarm. The status of the override may be annunciated locally and/or remotely to higher level system controls of the cooling system. Once the condition triggering the alarm has been remediated, the fan array fault response control system will return to the operating mode and the fan array fault response control system will return the fans to normal operation. For example, upon the loss of a fan speed control signal at one or more of the fans, the fan array fault response control system will enter a safe mode and the one or more fans will operate at a failsafe speed. The fan array fault response control system will return to the operating mode and the one or more fans will automatically resume normal speed on restoration of the control signal.

The fans may include one or more fans having electronically commutated (EC) motors. The EC motors are configured to send an alarm signal to the fan array fault response control system in the event of a fan failure.

Figure 1A:
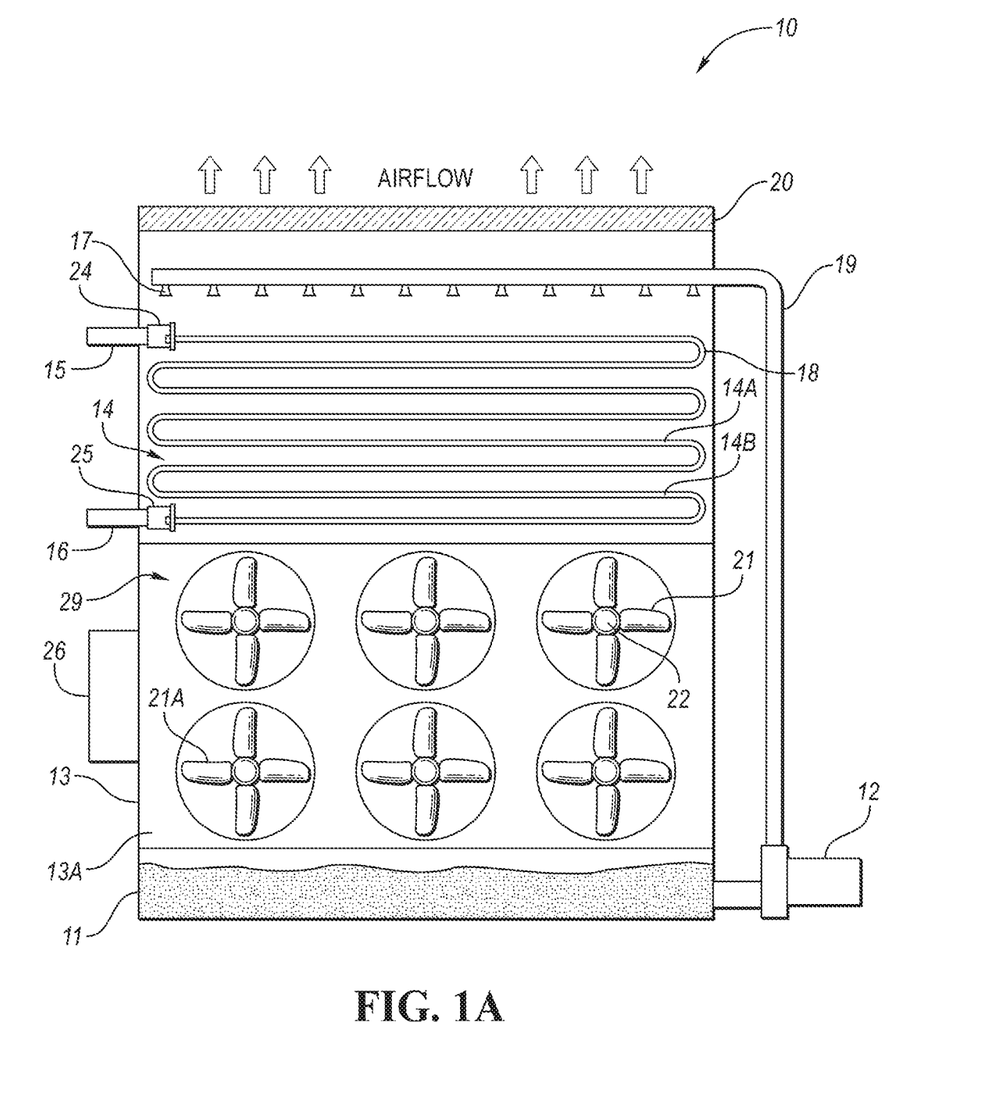
FIG. 1A is a view of a cooling tower.

Referring now to FIG. 1A, a heat rejection apparatus such as a cooling tower 10 is provided that includes a pump 12, a heat exchanger such as an indirect heat exchanger 14, a liquid distribution system 19, a drift eliminator 20, and a fan array 29 including a plurality of fans 21 having motors 22. The cooling tower 10 has a housing 13 that supports the fans 21 and forms an internal compartment 13A which contains the indirect heat exchanger 14 and the liquid distribution system 19.

The cooling tower 10 may take a variety of forms. For example, the cooling tower 10 may include a direct heat exchanger including fill sheets that receive liquid from the liquid distribution system 19 and airflow generated by the fans 21 directly cools the liquid. As another example, the cooling tower 10 may include a heat exchanger having two or more different heat exchange elements such as serpentine coils for indirectly cooling a process fluid that travels through the serpentine coils and fill sheets that receive the liquid sprayed onto the serpentine coils that permit the liquid to be directly cooled by airflow within the cooling tower 10.

Figure 1B:
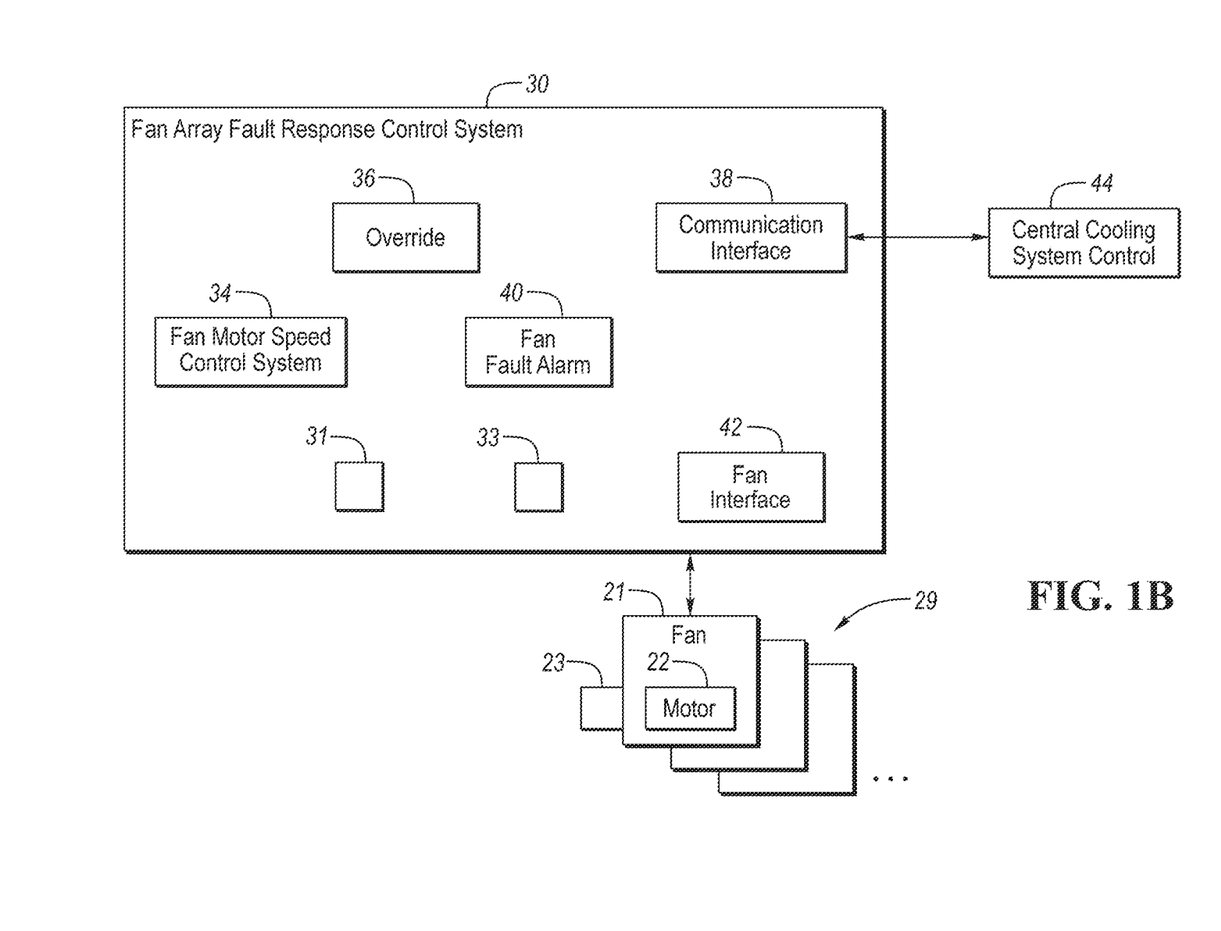
FIG. 1B is schematic view of a fan array fault response control system of the cooling tower of FIG. 1A.

The fans 21 may each have a motor 22. As another example, a fan 21 may include a motor 22 that drives the fan 21 and one or more other fans 21. Referring momentarily to FIG. 1B, in one embodiment, the fans 21 have fan locks or keeps 23. The keeps 23 are configured to mechanically engage a portion of the fans 21, such as one or more fan blades and/or driveshafts, to inhibit rotation of the fan blades. The keep 23 associated with each fan 21 may be actuated to inhibit rotation of the fan blades upon the fan 21 becoming non-operational and resist the fan blades from spinning in a direction that causes a vacuum and draws out from the cooling tower 10 through the non-operational fan 21.

Returning to FIG. 1A, the cooling tower 10 may operate wet in the evaporative mode, partially wet in a hybrid mode or can operate dry, with the spray pump 12 turned off when ambient conditions or lower loads permit. The spray pump 12 receives the coldest cooled evaporatively sprayed fluid, usually water, from cold water sump 11 and pumps it to the liquid distribution system 19 where the water comes out of nozzles or orifices 17 to distribute water over the indirect heat exchanger 14. The liquid distribution system 19 and nozzles 17 operate to evenly distribute an evaporative fluid, such as water, over the top of the indirect heat exchanger 14. As the coldest water is distributed over the top of indirect heat exchanger 14, the fans 21 of the fan array 29 force or push ambient air in under indirect heat exchanger 14, generally upward through indirect heat exchanger 14, then through drift eliminators 20 which serve to prevent drift from leaving the unit.

In the fan array 29, there are six fans 21 and six motors 22 shown in this example but that fan array 29 may include any number of fans 21 and motors 22, such as in the range of two and twenty fan 21/motor 22 assemblies as one example. Each fan 21 may include fan blades 21A driven directly by a motor 22. Alternatively, each fan 21 may be a direct driven radial style fan or may utilize a belt or gear drive. The fans 21 may be electro-commutated (EC) fans that include circuitry configured to transmit an alarm signal in response to a failure of the fan 21.

The fan array 29 causes air to generally flow in a counterflow direction relative to the falling water emitted from the nozzles 17. Although FIG. 1A is shown with axial fans 21 forcing or pushing air through the unit, there could additionally or alternatively be a fan array on top of the unit that induces air through the unit.

The indirect heat exchanger 14 is shown with an inlet connection pipe 15 connected to inlet header 24 and outlet connection pipe 16 connected to outlet header 25. Inlet header 24 connects to the inlets of a plurality of coil circuits 14A while outlet header 25 connects to the outlet of the coil circuits 14A. Each coil circuit 14A includes run lengths 14B connected with return bend sections 18. It should be understood that the process fluid direction may be reversed to optimize heat transfer and is not a limitation to embodiments presented.

With reference to FIGS. 1A and 1B, the cooling tower 10 has a control box 26 that includes a controller for an evaporative coil product such as a fan array fault response control system 30. The fan array fault response control system 30 supplies the necessary power to fan motors 22 via a fan interface 42 and communicates via communication interface 38 with a central cooling system control 44, which may be part of an HVAC system of a building. For example, the fan array fault response control system 30 may include an electrical circuit having logic provided by switches and relays. In another embodiment, the fan array fault response control system 30 may include a programmable logic controller (PLC) or an application-specific integrated circuit (ASIC). The fan array fault response control system 30 may include hardware, such as a processor 31 and a non-transitory computer readable medium, such as a memory 33. As one example, the memory 33 may include random access memory (RAM), read only memory (ROM), an electrically erasable programmable read only memory (EEPROM), as some examples. The fan array fault response control system 30 may also include software. For example, the processor 31 of the fan array fault response control system 30 may execute computer-readable instructions stored in the memory 33.

The fan array fault response control system 30 includes a fan fault alarm 40 that communicates with the fans 21 via a fan interface 42 and detects failures of the fans 21. The fan fault alarm 40 may turn on or otherwise become active from a signal sent from the motor 22 or could be activated from other fan operating detection methods such as a differential pressure switch, an amperage sensing current device, or a sail switch. The fan array fault response control system 30 has an operating mode wherein the fan array fault response control system 30 permits the fan interface 42 of the fan array fault response control system 30 to send fan speed control signals to the fans 21 according to instructions from the central cooling system control 44. The fan speed control signals may include, for example, electrical power having a voltage and/or an amperage that is selected to provide a desired fan speed. As another example, the fan speed control signal may include a message communicated to a processor of the fan 21 and the fan-based processor directs the associated motor 22 to provide the desired fan speed. In one embodiment, the fan array fault response control system 30 is installed between the fans 21 and the central cooling system control 44 such that the fan array fault response control system 30 intercepts speed control signals sent from the central cooling system control 44 to the fans 21.

The fan array fault response control system 30 may also operate in a safe mode, whereby the fan array fault response control system 30 adjusts the speed of the fan 21 from the speed requested by the central cooling system control 44. The fan array fault response control system 30 further includes an override 36 that may be operated by the central cooling system control 44 and reconfigures the fan array fault response control system 30 to an override mode. In the override mode, the fan array fault response control system 30 permits the fan interface 42 to send fan speed control signals to the fans 21 that produce a fan speed requested by the central cooling system control 44. The central cooling system control 44 may operate the override 36 during, for example, a high-demand situation for the associated HVAC system.

The communication interface 38 may communicate with the central cooling system control 44 using a number of different physical layers. In one example, the communications can be carried via a wired or bus connection or via wireless radio communication. The communication interface 38 receives fan speed information from the central cooling system control 44 and communicates the fan speed information to the processor 31. The processor 31 is operatively coupled to the fan interface 42 of the fan array fault response control system 30 and causes the fan interface 42 to send fan speed control signals to the motors 22 of the fans 21. The communication interface 38 may communicate information from the fan array fault response control system 30 to the central cooling system control 44. For example, the communication interface 38 may communicate a fan fault annunciation from the fan fault alarm 40 and/or an override annunciation from the override 36 from the fan array fault response control system 30 to the central cooling system control 44.

Figure 2:
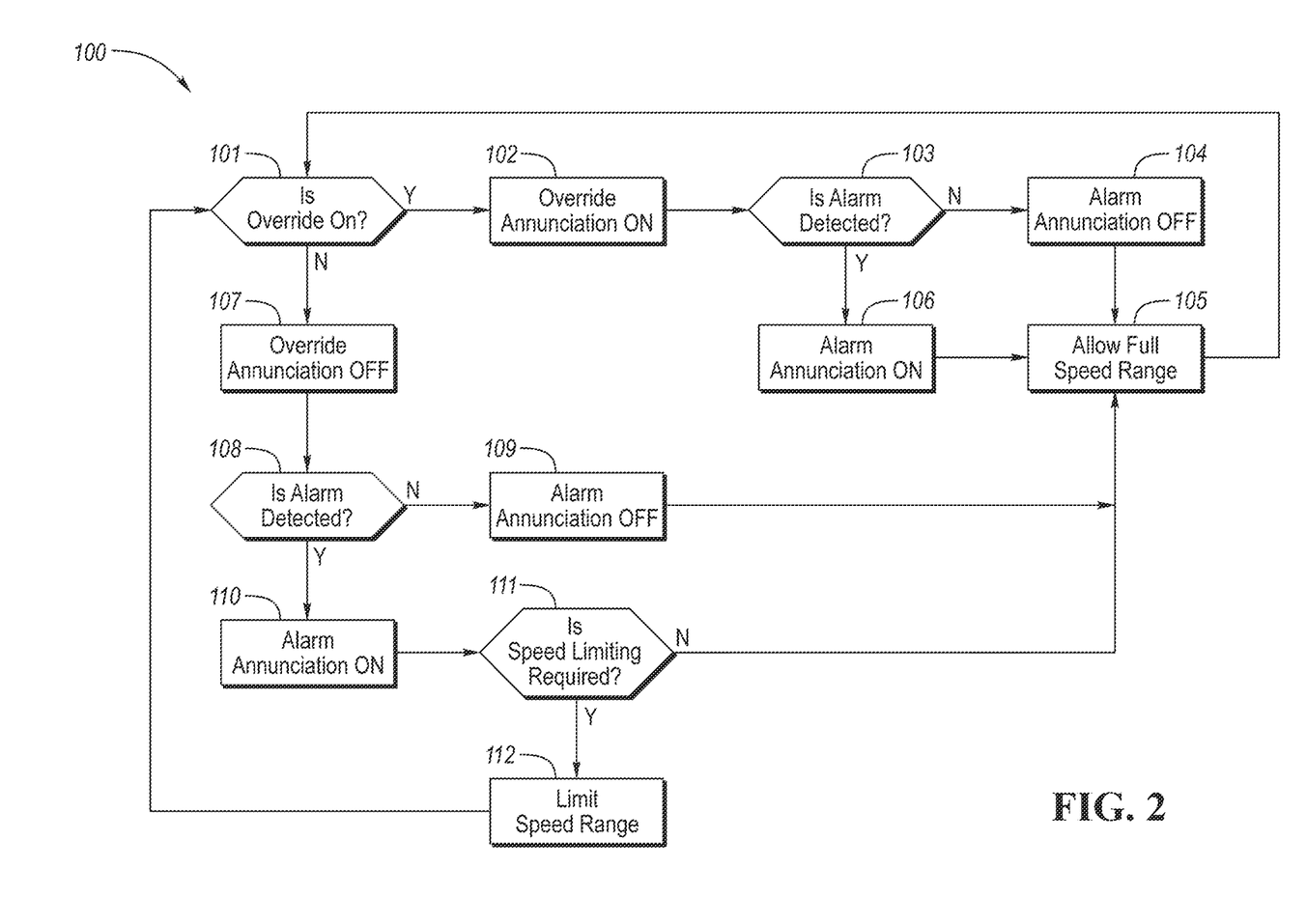
FIG. 2 is a flow diagram of a method of operating the fan array fault response control system of FIG. 1B.

Regarding FIG. 2, a method 100 is provided for operating the fan array fault response control system 30. The method 100 starts at operation 101 wherein the fan array fault response control system 30 determines the status of the override 36. In one embodiment, the override 36 includes an electrical or a software-based switch and the operation 100 involves checking whether the switch is turned on or turned off. The switch of the override 36 will be turned on upon the communication interface 38 receiving an override communication from the central cooling system control 44. If the override 36 is turned on, the fan array fault response control system 30 is in the override mode. For example, a user may have requested an override at a portable computing device, e.g., a smartphone, in communication with the central cooling system control 44. As another example, the central cooling system control 44 may have sent an override request without user input such as if the cooling tower 10 is in a high-demand situation. The switch of the override 36 will remain turned on until the communication interface 38 receives a request to change the switch of the override 36 to the off position. In one embodiment, the fan array fault response control system 30 may include a user interface at the cooling tower 10 that permits a user to change the switch of the override 36 between on and off positions.

If the override 36 is on at operation 101, the method 100 proceeds to set an override annunciation to ON at operation 102. If the override annunciation was previously ON, the override annunciation will remain ON. If the override annunciation was previously OFF, the override annunciation will be turned ON. The operation 102 may include a making a local override OFF annunciation such as an audio or visual alert from a user interface of the cooling tower 10. Alternatively or additionally, the operation 102 may include a remote override ON annunciation wherein the communication interface 38 sends an override ON annunciation communication to the central cooling system control 44. The central cooling system control 44 may relay the annunciation to an end user, such as building maintenance, such as via a display of the central cooling system 44, an SMS text message to a maintenance worker's phone, or an email to an email account associated with building maintenance.

Once the override annunciation is turned ON at operation 102, the override annunciation will remain ON until the override 36 is set to OFF by a user at the user interface of the cooling tower 10 or by a communication from the central cooling system control 44. In another embodiment, the fan array fault response control system 30 includes a timer that starts at operation 102. When the timer expires, the cooling tower 10 resets the override annunciation to OFF. This limits the duration the operation fans 21 may operate at the normal speed ranges requested by the central cooling system control 44 when there are one or more non-operational fans 21. In this manner, the fan array fault response control system 30 defaults to protecting the cooling tower 10 with a non-operational fan 21.

At operation 103, the fan array fault response control system 30 detects whether the fan fault alarm 40 has an alarm condition. In the alarm condition, the fan fault alarm 40 indicates an error or fault at one or more of the fans 21. If the fan fault alarm 40 is not in the alarm condition, the method 100 proceeds to operation 104 wherein an alarm annunciation is set to OFF. The operation 104 may include a local alarm OFF annunciation, such as an audio or visual announcement, at a user interface of the cooling tower 10. Alternatively or in addition, the operation 104 may include a remote alarm OFF annunciation such as the control circuitry 38 sending an alert annunciation communication to the central cooling system control 44. If the alarm annunciation was previously OFF, the alarm annunciation will remain OFF at operation 103. If the alarm annunciation was previously ON, the alarm annunciation will be turned OFF at operation 103.

The method 100 proceeds from operation 104 to operation 105 after operation 104. At operation 105, the fan array fault response control system 30 permits the fans 21 to operate throughout the full speed range of the fans 21. More specifically, the fan array fault response control system 30 permits all operational fans 21 in the fan array 29 to operate across their normal speed range as requested by the central cooling system control 44. The method 100 then returns to operation 101 wherein the fan array fault response control system 30 repeats the method 100 and continues to monitor the fans 21.

If, at operation 103, the fan array fault response control system 30 detects an alarm condition of the fan fault alarm 40, the method 100 proceeds to operation 106. At operation 106, the fan array fault response control system 30 sets an alarm annunciation to ON. The operation 106 may include a local alarm ON annunciation, such as an audio or visual announcement, at a user interface of the cooling tower 10. Alternatively or in addition, the operation 106 may include a remote alarm ON annunciation such as the control circuitry 38 sending an alarm ON annunciation communication to the central cooling system control 44. If the alarm annunciation was previously set to ON, the alarm annunciation will remain ON at operation 106. Conversely, if the alarm annunciation was previously set to OFF, the alarm annunciation will be turned ON at operation 106. The method 100 then proceeds to operation 105 discussed above Returning to operation 101, if the override 36 is turned off, the method 100 proceeds to operation 107 wherein the override annunciation is set to OFF. The operation 107 may include a making a local override OFF annunciation such as an audio or visual alert from a user interface of the cooling tower 10. Alternatively or additionally, the operation 107 may include a remote override OFF annunciation wherein the communication interface 38 sends an override OFF annunciation communication to the central cooling system control 44. If the override annunciation was previously OFF, the override annunciation remains OFF at operation 107. Conversely, if the override annunciation was previously ON, it will be turned OFF at operation 107.

The method 100 proceeds from operation 107 to operation 108. At operation 108, the fan array fault response control system 30 detects whether the fan fault alarm 40 has an alarm condition. The fan fault alarm 40 may have an alarm condition, for example, if the motor of one of the fans 21 has failed. In the alarm condition, the fan fault alarm 40 indicates an error or fault at one or more of the fans 21. If the fan fault alarm 40 is not in the alarm condition, the method 100 proceeds to operation 109 wherein the alarm annunciation is set to OFF.

Operation 109 may include making a local alarm OFF annunciation, such as at a user interface of the cooling tower 10. Alternatively or in addition, the operation 109 may include a remote alarm OFF annunciation such as the control circuitry 38 sending an alarm OFF annunciation to the central cooling system control 44. If the alarm annunciation was previously OFF, the alarm annunciation will remain OFF at operation 109. If the alarm annunciation was previously ON, the alarm annunciation will be turned OFF at operation 109. Once the alarm OFF annunciation has been made at operation 109, the method 100 proceeds to operation 105 discussed above.

If the fan array fault response control system 30 detects an alarm condition at operation 108, the method 100 proceeds to operation 110. At operation 110, the fan array fault response control system 30 sets the alarm annunciation to ON. The operation 110 may include a local alarm ON annunciation, such as at a user interface of the cooling tower 10. Alternatively or in addition, the operation 110 may include a remote alarm ON annunciation such as the control circuitry 38 sending an alarm ON annunciation communication to the central cooling system control 44. If the alarm annunciation was previously set to ON, the alarm annunciation will remain ON at operation 110. Conversely, if the alarm annunciation was previously set to OFF, the alarm annunciation will be turned ON at operation 110.

The method 100 proceeds from operation 110 to operation 111. At operation 111, alarm annunciation has been set to ON which indicates there is a fault at one or more of the fans 21 and the override annunciation has been set to OFF which indicates the override 36 has not been activated by a user or the central cooling system control 44. The fan array fault response control system 30 therefore determines whether speed limiting is required for the fans 21. Speed limiting may be required, for example, if the processor 31 determines that speed limiting is required to minimize reverse airflow through non-operational fans. As one example, the processor 31 may determine whether the spray pump 12 is energized and pumping water to the nozzles 17. This energization of the spray pump 12 indicates that that the cooling tower 10 is operating wet or partially wet and water is falling through the interior of the cooling tower 10. The processor 31 determines that speed limiting should be employed to limit egress of water through the opening of the non-operational fan 21. As another example, the cooling tower 10 may include an on-board vibration sensor operatively coupled to the processor 31. The processor 31 determines that speed limiting should be employed if a sensed portion of the cooling tower 10 is vibrating with a magnitude or frequency above a predetermined threshold. If speed limiting is not required at operation 111, the method 100 proceeds to operation 105 discussed above.

If speed limiting is required at operation 111, the fan array fault response control system 30 limits the speed range of one or more operational fans in the fan array 29 at operation 112. The fan array fault response control system 30 receives the requested fan speed for one or more of the fans 21 from the central cooling system 44. Because there is a non-operational fan 21 in the fan array 29, the fan array fault response control system 30 sends modified fan speed control signals to the operational fans 21 to effect a slower speed of one or more of the operational fans 21 than requested by the central cooling system control 44. As another example, the fan array fault response control system 30 and the central cooling system 44 communicate with the one or more fans 21 in a parallel manner. More specifically, the central cooling system control 44 may communicate a requested fan speed to the one or more fans 21. The fan array fault response control system 30 may communicate a limit speed range request to the one or more fans 21 that takes priority over the requested fan speed communication from the central cooling system control 44 such that the one or more fans 21 respond to the fan array fault response control system 30 communication rather than the central cooling system control 44. The operation 112 may involve limiting fan speed in a number of ways, and the following are exemplary approaches that may be used individually or together.

First, the fan array fault response control system 30 may limit fan speed by setting the operational fans 21 in the fan array 29 to have the same speed. The speed selected is based upon the configuration of the evaporative cooling device, operating conditions, operator inputs, method of control, as some examples. In one embodiment, the motors 22 are EC motors and whenever the fan speed control signal is lost, the motors 22 default to a reduced predetermined speed. The processor 31 may thereby limit fan speed by causing the fan interface 42 to not send a fan speed control signal to the operational fans 21, which will force all the motors 22 to operate at the same reduced predetermined speed. In another approach, rather than sending no fan speed control signal to the operational fans 21, the processor may cause the fan interface 42 to send the same fan speed control signal to the operational fans 21.

A forced draft evaporative heat exchanger having a fan array fault response control system in accordance with the subject disclosure was tested by causing a fan of a fan array of the unit to be non-operational. With the spray pump of the forced draft evaporative heat exchange turned on, it was determined that the EC motors of the operational fans of the unit should not be operated above a maximum speed of 60% for the tested unit. The maximum fan speed for the operative fans was therefore set to a speed of between 0% to 60% of the speed requested by a central cooling system control. It should be noted that the maximum fan speed of the operational fans depends on many variables such as position of non-operational fan, proximity of evaporative cooling units to buildings and other structures and the climate to name a few variables. In another test involving a different forced draft evaporative heat exchanger unit, a fan speed limit of 40% was the maximum speed limit that could be utilized without water coming out of the nonoperational fans of the heat exchanger. In another test where the spray pump of a forced draft evaporative heat exchanger was turned off, the fan motors of operational fans of the forced draft evaporative heat exchange unit could be operated at any desired level between 0% to 100% when there is at least one non-operational fan motor in the fan array of the unit. In some applications, the fan array fault response control system 30 may not be in communication with the spray pump 12. In this application, the fan array fault response control system 30 may assume that the spray pump 12 is on and limit fan speed upon failure of a fan 21.

Second, the fan array fault response control system 30 may limit fan speed by setting the operational fans 21 in the fan array 29 to different minimum and/or maximum speeds. The fan speeds selected may be based upon the configuration of the evaporative cooling device, operating conditions, operator inputs, position of the non-operational fans 21, as some examples. In one embodiment, the motors 22 are EC motors and the fan array fault response control system 30 includes a PLC. The PLC may look up preprogrammed speed values for each operational fan 21 based on the position of the non-operational fans 21 in the fan array 29. By operating the operational fans 21 individually, unit performance can be optimized when one or more of the fans 21 are non-operational in the fan array 29.

Third, the fan array fault response control system 30 may limit fan speed by setting the same fan speed range for the all of the operational fans 21, such as by setting minimum and/or maximum speed limits for the operational fans 21. The fan speed range selected may be based upon the configuration of the evaporative cooling device, operating conditions, operator inputs, and/or position of the nonoperating fans 21, as some examples. By setting the same minimum and/or maximum speed limits for the operational fans 21, the operational fans 21 will follow the fan speed requirements from the central cooling system control 44 as long as the fan speed requirements from the central cooling system control 44 are within the range set by the minimum and/or maximum speed limit. Should the central cooling system control 44 request a speed higher than a maximum set by the speed limiting operation 112, the operational fans 21 will run at the maximum speed allowed by the speed limiting operation 112. If the central cooling system control 44 requests a fan speed between the maximum speed limit and a minimum speed limit set at the speed limiting operation 112, the fans 21 will rotate at the requested fan speed. If the central cooling system control 44 requests a fan speed lower than the minimum speed limit set at the speed limiting operation 112, the operational fans 21 will run at the minimum speed allowed by the speed limiting operation 112. As noted above, the fan array fault response control system 30 may set a minimum speed limit to limit air exiting through the openings of the operational fans 21 that could occur if the central cooling system 44 requested stoppage of the operational fans 21. In another embodiment, the speed limiting operation 112 includes setting a maximum speed limit but does not include setting a minimum speed limit such that the operational fans 21 will rotate at the speed requested by the central cooling system control 44 as long as the requested speed is lower than the maximum speed limit. In another embodiment, the speed limiting operation 112 includes setting a minimum fan speed but does not include setting a maximum speed limit such that the operational fans 21 will rotate at the speed requested by the central cooling system control 44 as long as the requested speed is higher than the minimum speed limit.

Fourth, the fan array fault response control system 30 may limit fan speed by setting an individual fan speed range, such as by setting minimum and/or maximum fan speed limits, for each operational fan 21. The fan speed range for each fan 21 may be based upon operational fan 21 location, locations of non-operational fans 21, configuration of the evaporative cooling device, operating conditions, operator input, as some examples. Each fan 21 will follow the speed requirements from the central cooling system control 44 as long as the fan 21 is within the set fan speed range for the individual fan 21. For example, upon the central cooling system control 44 requesting a speed higher than the individual maximum set by the speed limiting operation 112, the operational fans 21 will run at the individual maximum speed allowed by the speed limiting operation 112. The maximum speed limit and/or the minimum speed limit set at the speed limiting operation 112 sets limits for the speeds of the operational fans 21 as discussed above. The method 100 then returns to operation 101.

In some applications, the processor 31 is configured to operate one or more fan keeps 23 to inhibit rotation of fan blades of associated fans 21. For example, it may be desirable to inhibit rotation of fan blades of a non-operational fan 21, fan blades of an operational fan 21, or fan blades of both a non-operational fan 21 and an operational fan 21. As such, the processor 31 may cause the keeps 23 to mechanically engage a portion of a fan 21 (e.g., fan blades and/or a driveshaft) to inhibit rotation of the fan blades.

Figure 3A:
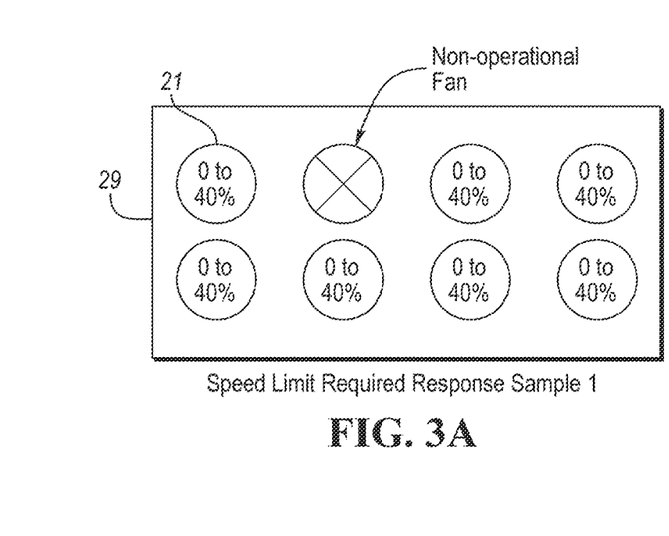
FIG. 3A is a schematic view of an eight-fan array with operational fans limited to 0% to 40% fan speed.

Turning to FIG. 3A, the fan 21A in the fan array 29 is nonoperational and the fan array fault response control system 30 is controlling the speeds of all the operational fans 21 to a minimum of 0% and a maximum of 40% fan speed. This maximum fan speed setting is chosen typically when the spray pump 12 is energized to limit the amount of air and water splash that may otherwise come out of the nonoperational fan 21A should the fan speeds rise about 40%. The 40% selected maximum fan speed is adjustable depending on many factors such as configuration of the evaporative cooling device, operating conditions, operator inputs, method of control, position of nonoperational motor 21A, and other factors.

Figure 3B:
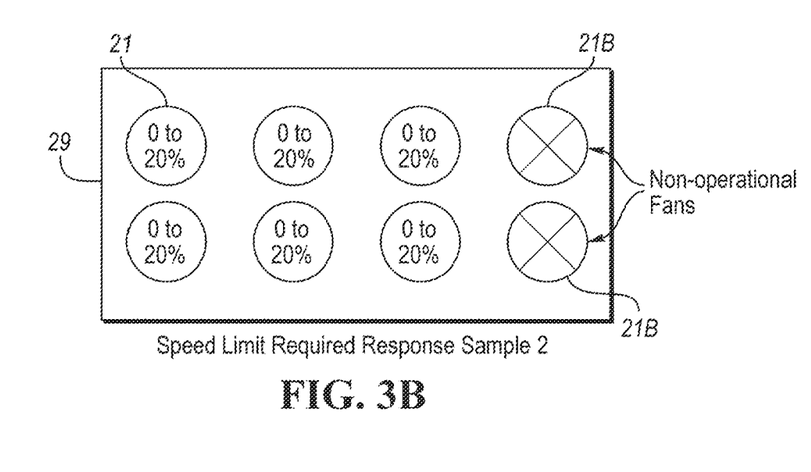
FIG. 3B is a schematic view of an eight-fan array with operational fans limited to 0% to 20% fan speed.

Referring to FIG. 3B, the fans 21B of the fan array 29 are non-operational and the fan array fault response control system is controlling the speeds of all the operational motors 21 to a minimum of 0% and a maximum of 20% fan speed. This maximum fan speed setting is chosen typically when the spray pump 12 is energized to limit the amount of air and water splash that may otherwise come out of the nonoperational fans 21B should the fan speeds rise about 20%. The 20% selected maximum fan speed is adjustable depending on many factors such as configuration of the evaporative cooling device, operating conditions, operator inputs, method of control, position of non-operational fan 21 and other factors.

Figure 4A:
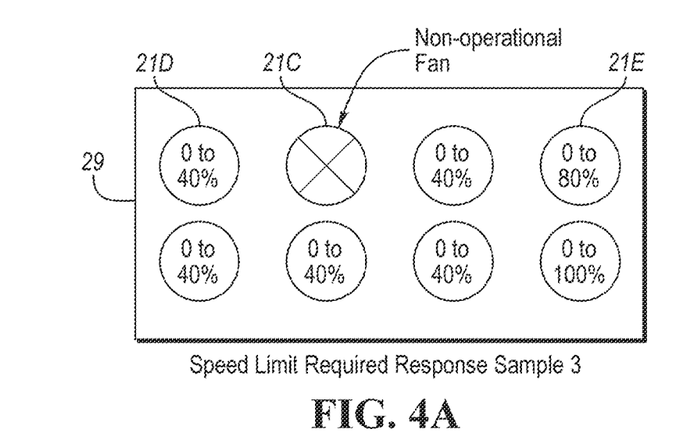
FIG. 4A is a schematic view of an eight-fan array where fan speeds are selectively controlled.

Now referring to FIG. 4A, the fan 21C is nonoperational and the fan array fault response control system 30 is now individually controlling the speeds of the operational fans 21 at different operational speeds. In this case, the speeds are being controlled based on the proximity from the nonoperational fan 21C. More specifically, the fans 21C, 21E immediately surrounding the nonoperational fan 21C are set to a maximum speed of 40% while fans 21D farther away are set to maximum speeds that will allow the unit to operate at a higher capacity while limiting air and water from exiting from the nonoperational fan 21C. The maximum fan speeds may be selected by the processor 31 based upon factors such as configuration of the evaporative cooling device, operating conditions, operator inputs, method of control.

Figure 4B:
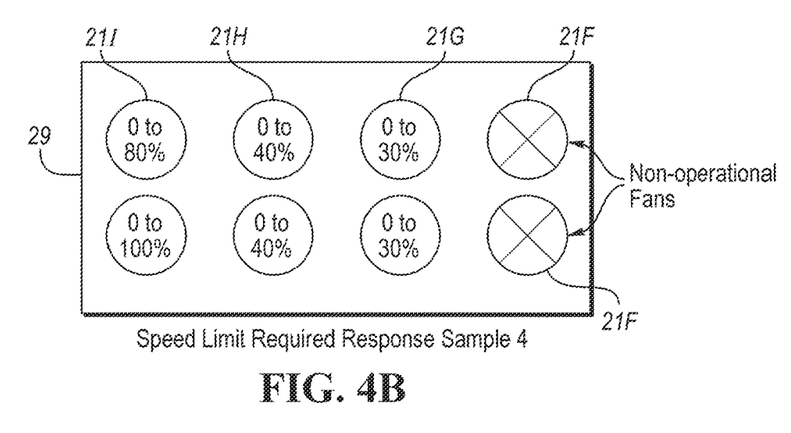
FIG. 4B is a schematic view of an eight-fan array where fan speeds are selectively controlled.

Turning to FIG. 4B, the fans 21F are non-operational and the fan array fault response control system is now individually controlling the speeds of the operational fans 21 at different operational speeds. In this case, the speeds are being controlled due to proximity from the nonoperational fans 21F. Note that the fans 21G immediately surrounding the nonoperational fans 21F are set to a maximum speed of 30%, the fans 21H farther away in the next column are set to a maximum fan speed of 40%, and the fans 21I still farther away are set to maximum speeds of 80% to 100%. By permitting the fans 21I to operate up to 80% of the fan speed requested by the central cooling system control 44, the cooling tower 10 may operate at a higher capacity while the 30% and 40% speed limits of the fans 21G, 21H limits air and water from exiting from the non-operational fans 21F. The maximum fan speeds are chosen from extensive lab data and are available in the PLC program. Other factors such as configuration of the evaporative cooling device, operating conditions, operator inputs, method of control may be considered in setting the speed limit for the operational fans 21.

Figure 4C:
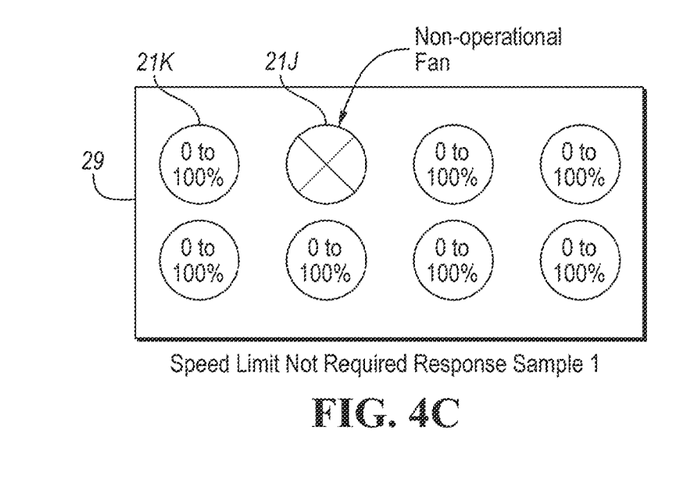
FIG. 4C is a schematic view of an eight-fan array where full fan operational speeds are permitted.

Turning to FIG. 4C, the fan 21J is non-operational and the fan array fault response control system 30 has determined that it is acceptable to run the operational fans 21K up to full speed (100%) if desired. This determination may be based at least in part on the fan array fault response control system 30 determining that the spray water pump 12 is not energized, and/or that a user or the central cooling system control 44 has turned ON the override 36. On some units, when the spray water pump 12 is off or not energized, it is safe to operate all the fans 21 from 0% to 100%. When a fan 21 has become non-operational, the customer or the central cooling system control 44 can override to fan array fault response control system 30 to achieve maximum fan speeds.

Figure 4D:
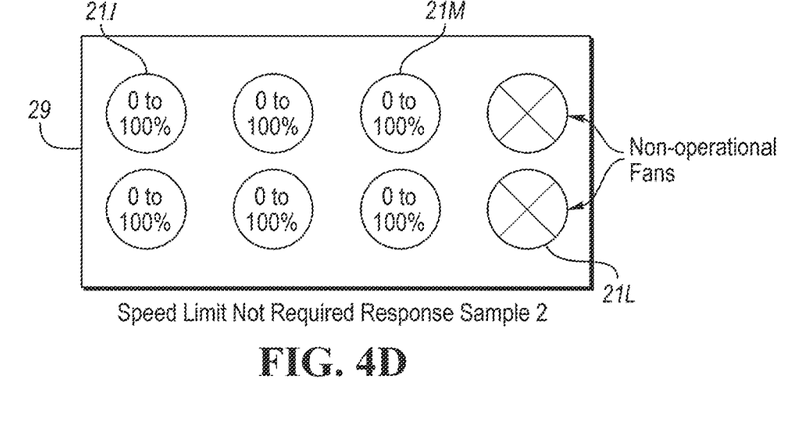
FIG. 4D is a schematic of an eight-fan array where full fan operational speeds are permitted.

Regarding FIG. 4D, the fans 21L are non-operational and the fan array fault response control system 30 has determined that it is acceptable to run the operational fans 21L up to full speed (100%) if desired. This determination may be based at least in part on the fan array fault response control system 30 determining that the spray water pump 12 is not energized, and/or that the user or the central cooling system control 44 has turned ON the override 36.

Figure 5:
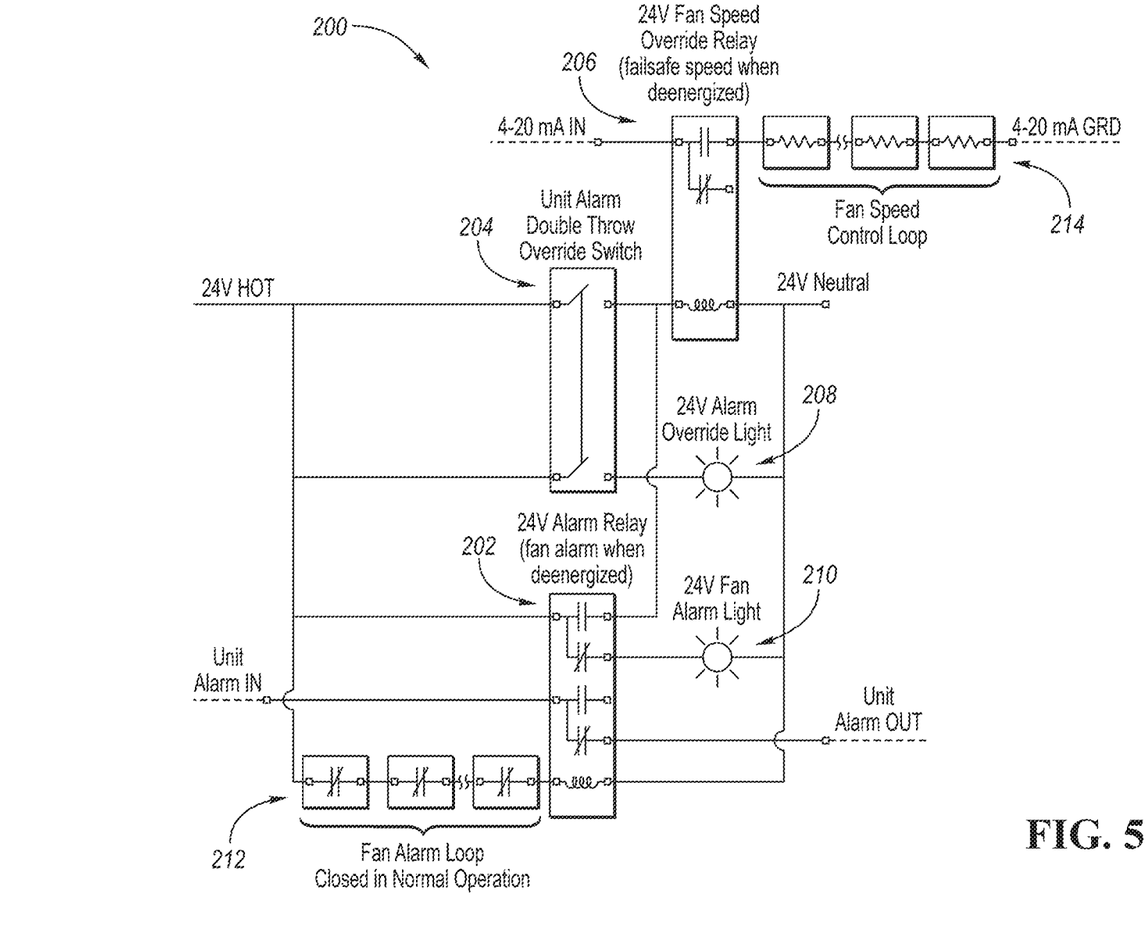
FIG. 5 is a wiring schematic of an example of a fan array fault response control system.

FIG. 5 is a wiring schematic of a fan array fault response control system 200. In this embodiment, there are relays that operate to control the maximum speeds of the fans 21. The fan array fault response control system 200 includes a 24V alarm relay 202, a manual override switch 204, an override relay 206, an override light 208, and a fan alarm light 210, a fan alarm loop 212 that can be set off by any of the fans 21 or by another system input, and a fan speed control loop 214. The fans 21 include EC motors 22, and the components of the fan array fault response control system 200 function to remove the control signal (4-20 ma) from each EC fan motor upon failure of one of the fans 21. Upon the fan array fault response control system 200 removing the control signal from the operational fans 21, the motor 22 of each operational fan 21 runs at a previously selected maximum fan speed (usually between 20 to 70% based on lab data and unit orientation).

During normal operation of a fan 21, the fan alarm loop 212 may be closed and the fan alarm light 210 may be off. When the fan 21 loses a control signal (which may be communicated from the fan array fault response control system 200 or a central cooling system control 44), the fan alarm loop 212 remains closed and the fan alarm light 212 remains off. When the fan 21 fails or loses power, the fan alarm loop 212 opens and the fan alarm light 210 turns on. Upon loss of power to the unit (e.g., the cooling tower 10), the fan alarm loop 212 may open and the fan alarm light 210 remains off or, if on, turns off.

During normal operation of a fan 21, contacts of the manual override switch 204 are open and the override light 208 is off. When the fan 21 loses a control signal, the contacts of the manual override switch 204 remain open. When the fan 21 fails or loses power, the contacts of the manual override switch 204 may be closed and the override light 208 may turned on. The override switch 204 and light 208 may not be affected by the presence or absence of a fan alarm or control signal. The override switch 204 may be separately actuated (either manually or by the higher level control system 44). The light 208 may only annunciate when the override switch 204 is closed and the unit is powered.

Upon loss of power to the unit (e.g., the cooling tower 10), the fan alarm loop 212 may open and the override light 208 may remain off or, if on, may turn off.

Upon loss of a control signal at the fan 21, the fan 21 may operate at a failsafe speed; for example, as requested by the fan array fault response control system 200. In one approach, the fan array fault response control system 200 may include a wire break detection. In this way, fans 21 upstream of an internal control wire break can operate as normal, and fans 21 downstream of the internal control wire break operate at the failsafe speed.

In another embodiment of the cooling tower 10, the fan array fault response control system 30 may operate one or more physical partitions, such as a movable cover, to reduce air and water flow through the opening associated with one or more non-operational fans 21. The use of physical partitions may be in addition to, or instead of, limiting the speed of the operational fans 21.

In one embodiment, the central cooling system control 44 includes a memory or is in communication with a cloud-based storage system to record historical data regarding the operation of the fan array fault response control system 30. The communication interface 38 may communicate with the central cooling system control 44 regarding instances when the system 30 limits the speed of the fans 21 and/or upon the override 36 being turned on by a user, as some examples.

While there have been illustrated and described particular embodiments of the present invention, it will be appreciated that numerous changes and modifications will occur to those skilled in the art, and it is intended for the present invention to cover all those changes and modifications which fall within the scope of the appended claims. For example, it will be appreciated that certain actions and/or operations may be described or depicted in a particular order of occurrence while those skilled in the art will understand that such specificity with respect to sequence is not actually required. It is intended that the phrase "at least one of" as used herein be interpreted in the disjunctive sense. For example, the phrase "at least one of A and B" is intended to encompass only A, only B, or both A and B.

What is claimed is:

1. A fan array fault response control system for a cooling tower, the fan array fault response control system comprising:
 a fan interface configured to be in communication with a plurality of fans;
 a fan fault alarm that activates in response to at least one non-operational fan;
 a processor operably coupled to the fan interface and configured to
 effect, in response to activation of the fan fault alarm, a reduced fan speed of at least one operational fan of the plurality of fans; and
 wherein the processor is configured to effect the reduced fan speed of the at least one operational fan until deactivation of the fan fault alarm.

2. The fan array fault response control system of claim 1 wherein the processor is configured to effect the reduced fan speed of the at least one operational fan of the plurality of fans based at least in part on the proximity of the at least one operational fan to the at least one non-operational fan.

3. The fan array fault response control system of claim 2 wherein the at least one operational fan includes a plurality of operational fans; and
 wherein the processor is configured to effect different reduced fan speeds for the operational fans based at least in part upon the proximity of each operational fan to the at least one non-operational fan.

4. The fan array fault response control system of claim 1 wherein the at least one operational fan includes a plurality of operational fans; and
 wherein the processor is configured to effect a reduced fan speed of the plurality of operational fans.

5. The fan array fault response control system of claim 4 wherein the processor is configured to effect the same reduced fan speed for the operational fans.

6. The fan array fault response control system of claim 4 wherein the processor is configured to effect different reduced fan speeds for the operational fans.

7. The fan array fault response control system of claim 1 wherein the processor is configured to effect the reduced fan speed of the at least one operational fan by at least one of:
 setting a maximum fan speed;
 setting a minimum fan speed; and
 limiting the at least one operational fan to a portion of a requested speed for the at least one of the operational fan.

8. The fan array fault response control system of claim 1 further comprising a communication interface configured to communicate with a central system controller, the processor operably coupled to the communication interface;
 wherein the communication interface is configured to receive a communication from the central system controller indicative of a requested fan speed for the at least one operational fan; and
 wherein the processor is configured to effect the reduced fan speed of the at least one operational fan that is less than the requested fan speed.

9. The fan array fault response control system of claim 1 wherein the fan interface is configured to receive a fault indication from the at least one non-operational fan.

10. The fan array fault response control system of claim 1 in combination with a forced draft cooling tower including the fans.

11. The fan array fault response control system of claim 10 wherein the reduced fan speed of the at least one operational fan is below a speed at which evaporative fluid would discharge from the at least one non-operational fan.

12. The fan array fault response control system of claim 1 wherein to effect the reduced fan speed of the at least one operational fan includes to determine the reduced fan speed for the at least one operational fan.

13. The fan array fault response control system of claim 1 further comprising a communication interface operably coupled to the processor;
wherein the processor is configured to cause the communication interface to communicate a notification of the activation of the fan fault alarm to a remote device.

14. The fan array fault response control system of claim 1 further comprising a communication interface operably coupled to the processor, the communication interface configured to receive a command from a remote device via a network; and
wherein the processor is configured to deactivate the fan fault alarm in response to the communication interface receiving the command.

15. The fan array fault response control system of claim 1 in combination with a local notification apparatus operably coupled to the processor; and
wherein the processor is configured to operate the local notification apparatus upon activation of the fan fault alarm.

16. The fan array fault response control system of claim 1 wherein the fan fault alarm activates in response to a signal from:
the at least one non-operational fan;
a pressure differential switch;
a current sensor;
a sail switch; or
a combination thereof.

17. The fan array fault response control system of claim 1 wherein the processor is configured to effect the reduced fan speed of the at least one operational fan by:
providing electrical power to the at least one operational fan; and/or
communicating a message to a processor of the at least one operational fan.

18. A heat rejection apparatus comprising:
a heat exchanger;
a plenum upstream of the heat exchanger;
a liquid distribution system configured to direct evaporative liquid toward the heat exchanger;
a plurality of fans upstream of the heat exchanger and configured to generate airflow from the plenum to the heat exchanger, the fans configured to direct airflow into the plenum upstream of the heat exchanger and create a positive air pressure in the plenum upstream of the heat exchanger;
a sump arranged to receive evaporative liquid from the heat exchanger;
a pump operable to pump liquid from the sump to the liquid distribution system; and
a controller operably coupled to the fans and configured to:
detect at least one non-operational fan of the plurality of fans; and
effect a reduced fan speed of at least one operational fan of the plurality of fans upon detecting the at least one non-operational fan to reduce air pressure in the plenum acting on the at least one non-operational fan.

19. The heat rejection apparatus of claim 18 wherein the controller is configured to effect the reduced fan speed of the at least one operational fan of the plurality of fans based at least in part on the proximity of the at least one operational fan to the at least one non-operational fan.

20. The heat rejection apparatus of claim 19 wherein the at least one operational fan includes a plurality of operational fans; and
wherein the controller is configured to effect different reduced fan speeds for the operational fans based at least in part upon the proximity of each operational fan to the at least one non-operational fan.

21. The heat rejection apparatus of claim 18 wherein the heat exchanger includes an inlet header that receives a process fluid, an outlet header, and a plurality of coil circuits connecting the inlet and outlet header; and
wherein each coil circuit includes a plurality of runs and bends connecting the runs.

22. The heat rejection apparatus of claim 12 wherein the reduced fan speed of the at least one operational fan is below a speed at which evaporative liquid would discharge from the at least one non-operational fan.

23. The heat exchange apparatus of claim 18 wherein there are no fans downstream of the plurality of fans.

24. A heat rejection apparatus comprising:
a heat exchanger;
a liquid distribution system configured to direct evaporative liquid toward the heat exchanger;
a plurality of fans configured to generate airflow relative to the heat exchanger;
a sump arranged to receive evaporative liquid from the heat exchanger;
a pump operable to pump liquid from the sump to the liquid distribution system; and
a controller operably coupled to the fans and configured to:
detect at least one non-operational fan of the plurality of fans;
effect a reduced fan speed of at least one operational fan of the plurality of fans upon detecting the at least one non-operational fan;
wherein the controller is operably coupled to the pump and is configured to determine whether the pump is operating; and
wherein the controller is configured to effect the reduced fan speed of the at least one operational fan of the plurality of fans upon detecting the at least one non-operational fan and determining the pump is operating.

25. A heat rejection apparatus comprising:
a heat exchanger;
a liquid distribution system configured to direct evaporative liquid toward the heat exchanger;
a plurality of fans configured to generate airflow relative to the heat exchanger;
a sump arranged to receive evaporative liquid from the heat exchanger;
a pump operable to pump liquid from the sump to the liquid distribution system; and
a controller operably coupled to the fans and configured to:
detect at least one non-operational fan of the plurality of fans;
effect a reduced fan speed of at least one operational fan of the plurality of fans upon detecting the at least one non-operational fan;
wherein the controller is operably coupled to the pump and determines whether the pump is pumping liquid to the liquid distribution system; and wherein the controller is configured to:
effect a first reduced fan speed of the at least one operational fan upon detecting the at least one non-operational fan and determining the pump is pumping liquid to the liquid distribution system; and
effect a second fan speed of the at least one operational fan upon detecting the at least one non-operational fan and determining the pump is not pumping liquid to the liquid distribution system.

26. A heat rejection apparatus comprising
a heat exchanger;
a liquid distribution system configured to direct evaporative liquid toward the heat exchanger;
a plurality of fans configured to generate airflow relative to the heat exchanger;
a sump arranged to receive evaporative liquid from the heat exchanger;
a pump operable to pump liquid from the sump to the liquid distribution system; and
a controller operably coupled to the fans and configured to:
detect at least one non-operational fan of the plurality of fans;
effect a reduced fan speed of at least one operational fan of the plurality of fans upon detecting the at least one non-operational fan;
a keep configured to mechanically engage a portion of the at least one non-operational fan and inhibit rotation of fan blades of the fan; and
the controller is configured to actuate the keep upon determining the at least one fan is non-operational.

27. A method of controlling a heat rejection apparatus comprising a heat exchanger, a liquid distribution system configured to direct liquid toward the heat exchanger, and a plurality of fans configured to generate airflow relative to the heat exchanger, the method comprising:
operating the fans to direct air into a plenum of the heat rejection apparatus upstream of the heat exchanger and provide an air pressure in the plenum higher than ambient air pressure;
detecting at least one of the fans is non-operational; and
causing, upon detecting the at least one non-operational fan, at least one operational fan of the plurality of fans to rotate at a reduced fan speed and provide a reduced air pressure in the plenum.

28. The method of claim 27 further comprising selecting the at least one operational fan of the plurality of fans based at least in part on the proximity of the at least one operational fan to the at least one non-operational fan.

29. The method of claim 27 wherein the at least one operational fan includes a plurality of operational fans; and
wherein causing the at least one operational fan of the plurality of fans to rotate at the reduced fan speed includes causing different operational fans to rotate at different speeds based at least in part on the proximity of each operational fan to the at least one non-operational fan.

30. The method of claim 27 further comprising checking whether an override command has been received; and
wherein the causing the at least one operational fan of the plurality of fans to rotate at the reduced fan speed includes causing the at least one operational fan to rotate at the reduced fan speed upon the override command not having been received.

31. The method of claim 27 further comprising receiving a requested fan speed for the at least one operational fan from a central system controller; and wherein the causing the at least one operational fan of the plurality of fans to rotate at the reduced fan speed includes causing the at least one operational fan to rotate at less than the requested fan speed from the central system controller.

32. The method of claim 27 wherein the reduced air pressure is higher than ambient air pressure.

33. A fan array fault response control system of claim 1 for a cooling tower, the fan array fault response control system comprising:
a fan interface configured to be in communication with a plurality of fans;
a processor operably coupled to the fan interface and configured to detect at least one non-operational fan of the plurality of fans;
the processor configured to effect, in response to detecting the at least one non-operational fan, a reduced fan speed of at least one operational fan of the plurality of fans;
wherein the processor is configured to activate a fan fault alarm in response to the detection of the at least one non-operational fan; and
wherein the processor is configured to effect the reduced fan speed of the at least one operational fan until deactivation of the fan fault alarm.

34. A fan array fault response control system for a cooling tower, the fan array fault response control system comprising:
a fan interface configured to be in communication with a plurality of fans;
a processor operably coupled to the fan interface and configured to detect at least one non-operational fan of the plurality of fans;
the processor configured to effect, in response to detecting the at least one non-operational fan, a reduced fan speed of at least one operational fan of the plurality of fans;
an override having an off condition and an on condition;
a communication interface to receive an override communication;
wherein the processor is configured to change the override from the off condition to the on condition upon the communication interface receiving the override communication;
wherein the processor is configured to effect the reduced fan speed of the at least one operational fan in response to detecting the at least one non-operational fan with the override in the off condition; and
wherein the processor is configured to not effect the reduced fan speed of the at least one operational fan in response to detecting the at least one non-operational fan with the override in the on condition.

35. A heat rejection apparatus comprising:
a heat exchanger;
a liquid distribution system configured to direct evaporative liquid toward the heat exchanger;
a plurality of fans configured to generate airflow relative to the heat exchanger;
a sump arranged to receive evaporative liquid from the heat exchanger;
a pump operable to pump liquid from the sump to the liquid distribution system; and
a controller operably coupled to the fans and configured to:
detect at least one non-operational fan of the plurality of fans; and effect a reduced fan speed of at least one operational fan of the plurality of fans upon detecting the at least one non-operational fan;
wherein the controller is configured to activate a fan fault alarm in response to detecting the at least one non-operational fan; and
wherein the controller is configured to effect the reduced fan speed of the at least one operational fan until deactivation of the fan fault alarm.

36. A heat rejection apparatus comprising:
a heat exchanger;
a liquid distribution system configured to direct evaporative liquid toward the heat exchanger;
a plurality of fans configured to generate airflow relative to the heat exchanger;
a sump arranged to receive evaporative liquid from the heat exchanger;
a pump operable to pump liquid from the sump to the liquid distribution system; and
a controller operably coupled to the fans and configured to:
  detect at least one non-operational fan of the plurality of fans; and
  effect a reduced fan speed of at least one operational fan of the plurality of fans upon detecting the at least one non-operational fan;
wherein the controller includes an override having an off condition and an on condition, the controller configured to change the override from the off condition to the on condition upon the controller receiving an override communication;
wherein the controller is configured to effect the reduced fan speed of the at least one operational fan upon detecting the at least one non-operational fan with the override in the off condition; and
wherein the controller is configured to not effect the reduced fan speed of the at least one operational fan upon detecting the at least one non-operational fan with the override in the on condition.

37. A heat rejection apparatus comprising:
a heat exchanger;
a liquid distribution system configured to direct evaporative liquid toward the heat exchanger;
a plurality of fans configured to generate airflow relative to the heat exchanger;
a sump arranged to receive evaporative liquid from the heat exchanger;
a pump operable to pump liquid from the sump to the liquid distribution system; and
a controller operably coupled to the fans and configured to:
  detect at least one non-operational fan of the plurality of fans; and
  effect a reduced fan speed of at least one operational fan of the plurality of fans upon detecting the at least one non-operational fan;
wherein the controller has a dry mode wherein the controller inhibits operation of the pump and a wet mode wherein the controller permits operation of the pump;
wherein the controller is configured to effect the reduced fan speed of the at least one operational fan upon detecting the at least one non-operational fan with the controller in the wet mode; and
wherein the controller is configured to not effect the reduced fan speed of the at least operational fan upon detecting the at least one non-operational fan with the controller in the dry mode.

38. A method of controlling a heat rejection apparatus comprising a heat exchanger, a liquid distribution system configured to direct liquid toward the heat exchanger, and a plurality of fans configured to generate airflow relative to the heat exchanger, the method comprising:
detecting at least one of the fans is non-operational;
causing, upon detecting the at least one non-operational fan, at least one operational fan of the plurality of fans to rotate at a reduced fan speed;
activating a fan fault alarm in response to detecting the at least one non-operational fan; and
causing the at least one operational fan to rotate at the reduced fan speed during operation of the fan until deactivation of the fan fault alarm.

39. A method of controlling a heat rejection apparatus comprising a heat exchanger, a liquid distribution system configured to direct liquid toward the heat exchanger, and a plurality of fans configured to generate airflow relative to the heat exchanger, the method comprising:
detecting at least one of the fans is non-operational;
causing, upon detecting the at least one non-operational fan, at least one operational fan of the plurality of fans to rotate at a reduced fan speed; and
wherein causing the at least one operational fan to rotate at the reduced fan speed comprises causing the at least one operational fan to rotate at the reduced fan speed upon detecting the at least one non-operational fan and an override of a fan array fault response control system of the heat rejection apparatus is in an off condition thereof.

* * * * *